United States Patent [19]
Melis et al.

[11] Patent Number: 5,428,268
[45] Date of Patent: Jun. 27, 1995

[54] LOW FREQUENCY SQUARE WAVE ELECTRONIC BALLAST FOR GAS DISCHARGE

[75] Inventors: Janos Melis; Oscar Vila-Masot, both of Miami, Fla.

[73] Assignee: LED Corporation N.V., St. Maarten, Netherlands Antilles

[21] Appl. No.: 89,183

[22] Filed: Jul. 12, 1993

[51] Int. Cl.$^6$ .............................................. H05B 41/16
[52] U.S. Cl. ................................... 315/247; 315/307; 315/324
[58] Field of Search ............. 315/247, 209 R, DIG. 7, 315/238, 307, 308, 175, 324

[56] References Cited

U.S. PATENT DOCUMENTS

| | | |
|---|---|---|
| 4,396,872 | 8/1983 | Nutter . |
| 4,475,065 | 10/1984 | Bhalla et al. .......................... 315/247 |
| 4,999,547 | 3/1991 | Ottenstein ...................... 315/DIG. 7 |
| 5,099,176 | 3/1992 | Fellows et al. ................. 315/209 R |
| 5,235,255 | 8/1993 | Blom . |

FOREIGN PATENT DOCUMENTS 9203898 3/1992 WIPO ........................... 315/DIG. 7

OTHER PUBLICATIONS

"A New Electronic Ballast for HID Lamps"; H. Nishimura et al; Journal of the Illuminating Engineering Society; Summer 1988; pp. 70–76.
"Electronic Ballasts for Metal Halide Lamps"; Faehnrich et al; Journal of the Illuminating Engineering Society; Summer 1988; pp. 131–140.

Primary Examiner—Robert J. Pascal
Assistant Examiner—Darius Gambino
Attorney, Agent, or Firm—Hoffman, Wasson & Gitler

[57] ABSTRACT

A low frequency square wave electronic ballast used for a gas discharge device includes a high power factor pre-regulator connected to a sinusoidal AC power supply and a power controlled DC current source connected to the pre-regulator. A low frequency square wave DC-to-AC inverter is connected to the DC current source and an ignitor circuit is connected to the inverter. A monitor circuit as well as a low power stabilized logic supply voltage source are also employed. The entire circuit is connected to a gas discharge device such that the instantaneous power of this device is constant and controlled providing an acoustic resonance free operation and an ideal ballast curve.

13 Claims, 11 Drawing Sheets

LOW FREQUENCY SQUARE WAVE ELECTRONIC BALLAST FOR GAS DISCHARGE

BACKGROUND OF THE INVENTION

1. Field of the Invention

The present invention relates to a low frequency power converter and specifically to low frequency electronic ballasts for gas discharge devices. More specifically, the present invention relates to a low frequency square wave electronic ballast for high pressure sodium lamps.

2. Prior Art

An important application for high frequency switch-mode power converters is supplying power to gas discharge devices, especially high pressure sodium (HPS) lamps. In the case of high frequency powering of gas discharge lamps, the high frequency ballast and the gas discharge lamp have a higher level of interaction than that which exists between a conventional low frequency ballast and gas discharge lamp. High frequency ballasts suffer from acoustic resonance which can cause various problems such as instability, high output fluctuation, or, in the worst case, cracked arc tubes. Therefore, an optimum solution to this problem is the use of a high frequency DC-to-DC switch-mode as a controlled current source connected to a low frequency DC-to-AC square wave inverter supplying the gas discharge lamp. Due to its lessened weight, higher efficiency and the nonexistence of acoustic resonances, this novel high frequency ballast with a low frequency output has significant advantages when compared with either the conventional low frequency ballasts and the usual high frequency electronic ballast. Additionally, a new, high sophisticated electronic ballast generation can be introduced to provide several special features, such as, for example, automatic or controlled dimming.

Therefore, the essential design targets for a highly sophisticated, high efficiency, low frequency electronic ballast supplying gas discharge lamps would be the following:

(a) very high efficiency ($\approx 95\%$), energy saving and low temperature rise of critical components;

(b) low frequency square wave lamp current (crest factor is unit). Since the instantaneous lamp power is constant (no flickering), no acoustic resonance can occur;

(c) high reliability and long life time (lower power loss, no electrolytic capacitors);

(d) fully controlled lamp power, eliminating the effects of line voltage fluctuation and lamp aging;

(e) programmed and/or controlled dimming providing essential energy saving;

(f) automatic switching off when the lamp has reached the end of its life time (programmed in advance);

(g) automatic light switching and high temperature protection; and (h) power factor correction ($PF \geq 95\%$) and EMI filtering.

The prior art is replete with many known circuits providing high frequency ballast for gas discharge lamps. For instance, high efficient electronic ballast which can be used with HPS (HID) lamps are discussed in U.S. Pat. No. 5,097,183 entitled "Master-Slave Half-bridge DC-to-AC Switchmode Power Converter" and U.S. patent application Ser. No. 883,762, filed May 15, 1992, entitled "Self-Symmetrizing and Self-Oscillating Half-Bridge Power Inverter" assigned to the assignee of the present invention.

SUMMARY OF THE INVENTION

It is an object of the present invention to provide a power controlled and current limited current source implementing the ideal ballast curve for HPS (HID) lamps.

A second object of the present invention is to provide a power controlled current source, wherein the power can be selected and/or continuously changed.

A further object of the present invention is to provide a high frequency DC-to-DC converter as a power controlled current source, wherein no electrolytic capacitors are used.

Another object of the present invention is to provide a high frequency buck converter configuration which has a substantially improved efficiency, wherein the control circuit is floating together with the main switching transistor.

A further object of the present invention is to provide a circuit, especially for a buck converter configuration, implementing the inversion of output voltage and zero current sensing.

Another object of the present invention is to provide a high efficiency square wave full-bridge inverter operation in a very wide frequency range including DC operation.

A further object of the present invention is to provide a logic control circuit controlling a square wave full-bridge inverter implementing programmed transition between the high (or zero) and the low frequency operations.

Another object of the present invention is to provide a low power stabilized logic supply voltage source connected to main voltage, wherein no electrolytic capacitors are used.

A further object of the present invention is to provide a low power stabilized logic supply voltage source connected to main voltage, wherein no electrolytic capacitors are used.

DETAILED DESCRIPTION OF THE INVENTION

Figure 1:
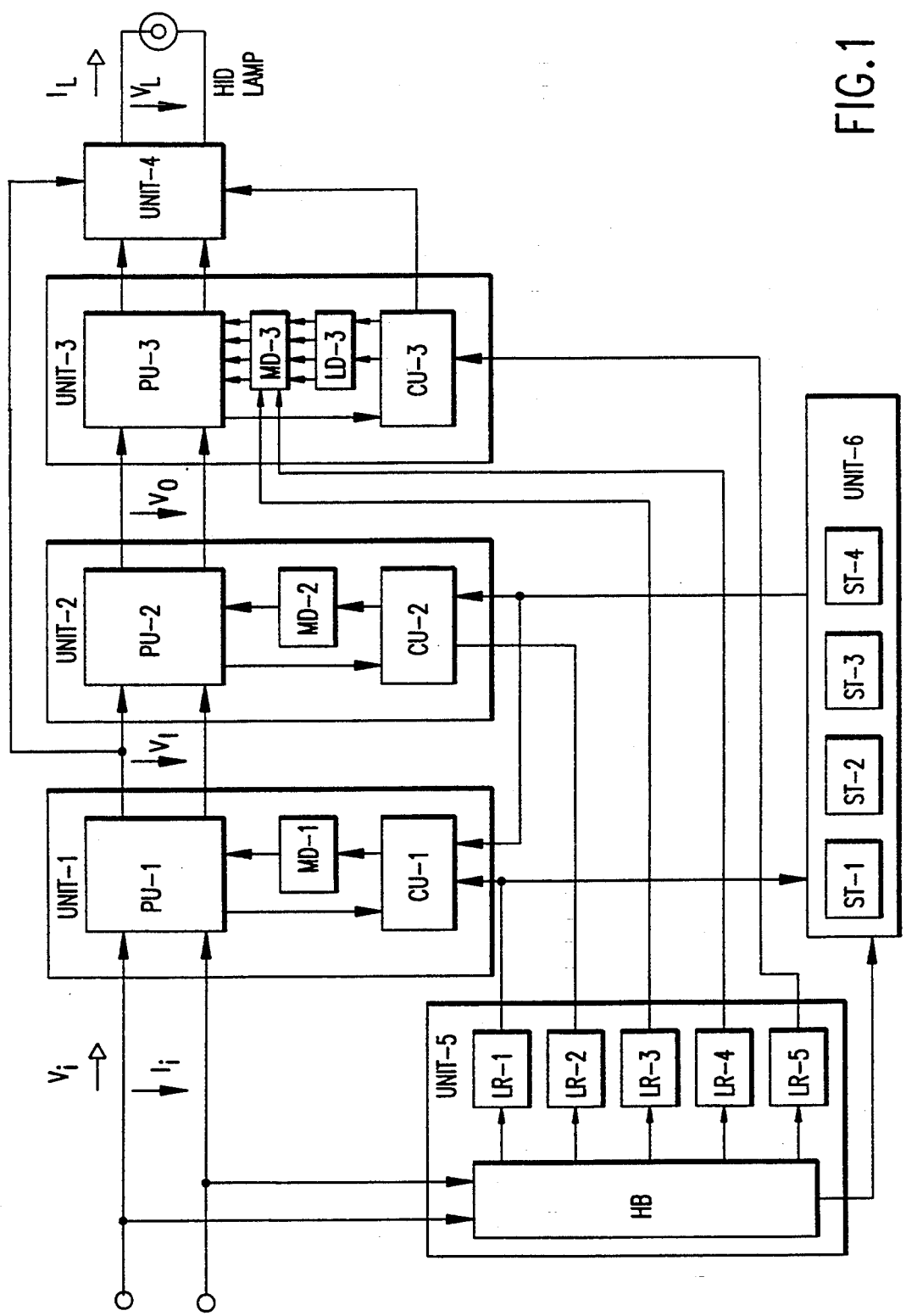
FIG. 1 illustrates a schematic diagram of the preferred electronic ballast for gas discharge devices including six basic units.

FIG. 1 illustrates a schematic diagram of the preferred electronic ballast for gas discharge devices including:

- a high power factor preregulator designated as UNIT-1 including a boost converter (PU-1), a MOSFET driver (MD-1) and a control unit (CU-1);
- a power controlled DC current source designated as UNIT-2 including a buck converter (PU-2), a MOSFET driver (MD-2) and a control unit (CU-2);
- a low-frequency square wave DC-to-AC converter designated as UNIT-3 including a full-bridge square wave inverter (PU-3), four MOSFET drivers (MD-3), a logic driver (LD-3) and a frequency control unit (CU-3);
- a high voltage ignitor circuit designated as UNIT-4;
- a stabilized logic supply voltage source designated as UNIT-5 including a low power half-bridge square wave inverter (HB) and five linear regulators (LR-1, LR-2, LR-3, LR-4 and LR-5);
- a monitor unit designated as UNIT-6 including an input voltage, a temperature and a light sensing circuit; and
- a gas discharge device, especially a high pressure sodium lamp designated as HID lamp.

Figure 2A:
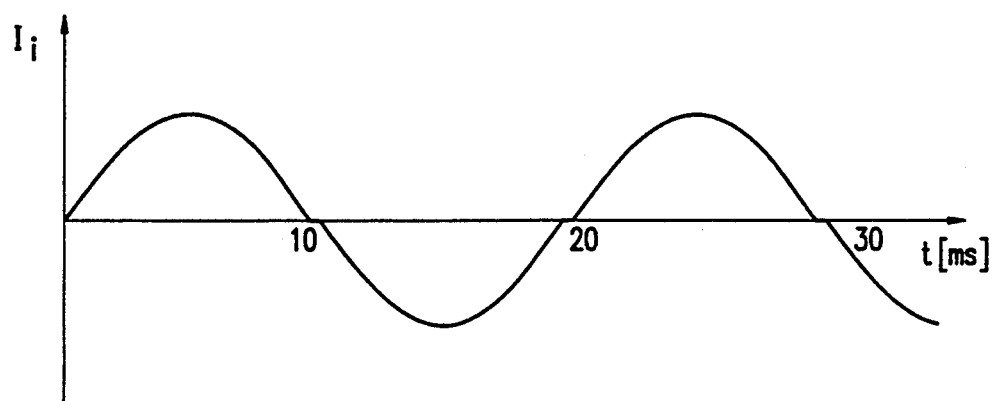
FIGS. 2A, 2B and 2C show the voltage and current waveforms with respect to the schematic diagram of FIG. 1.
Figure 2B:
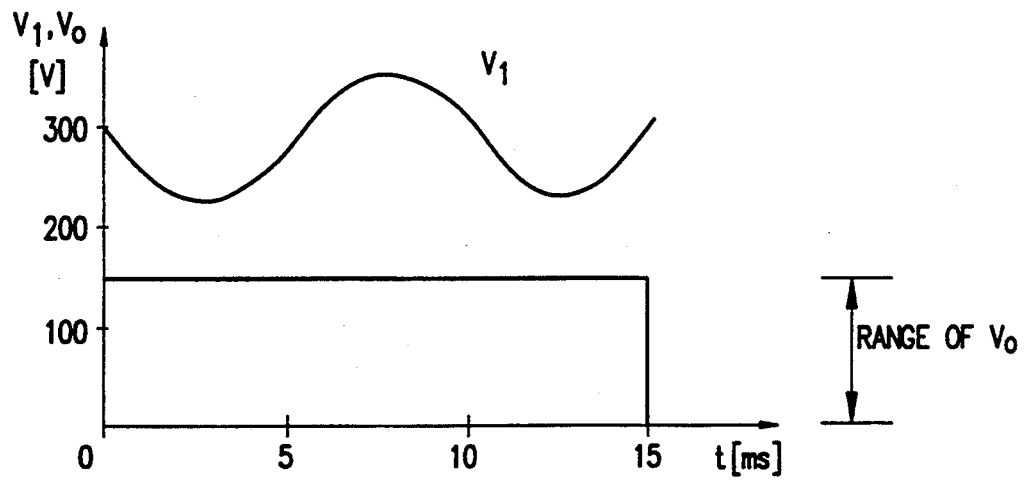
Figure 2C:
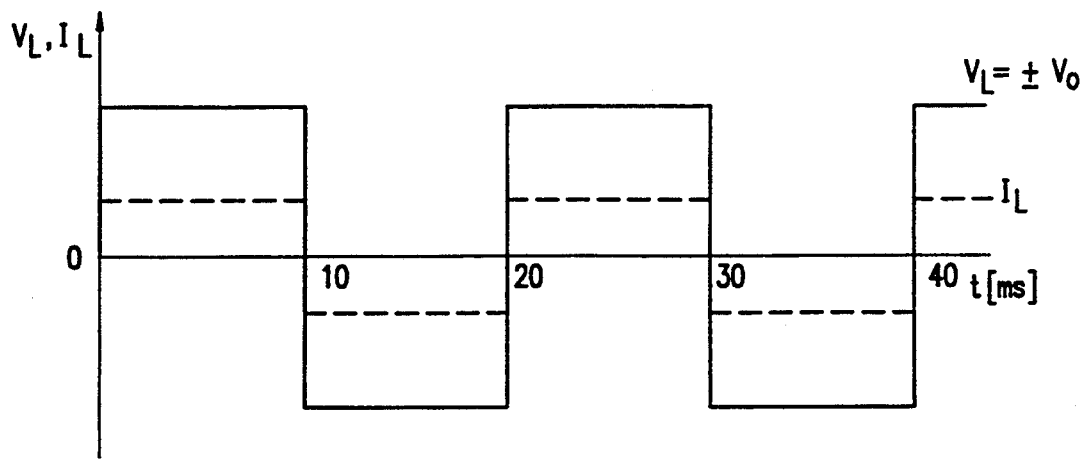

FIGS. 2A, 2B and 2C show some characteristic voltage and current waveforms of the preferred electronic ballast with respect to schematic diagram of FIG. 1. Particularly, FIG. 2A shows the nearly sinusoidal input current ($I_i$) of the high power factor preregulator. Furthermore, FIG. 2B shows the input ($V_1$) and output ($V_o$) voltages of the power controlled DC current source. FIG. 2C shows the lamp voltage ($V_L = \pm V_o$) and lamp current ($I_L$) waveforms in the normal, low frequency mode. This figure illustrates that an instantaneous lamp power can be obtained.

Figure 3A:
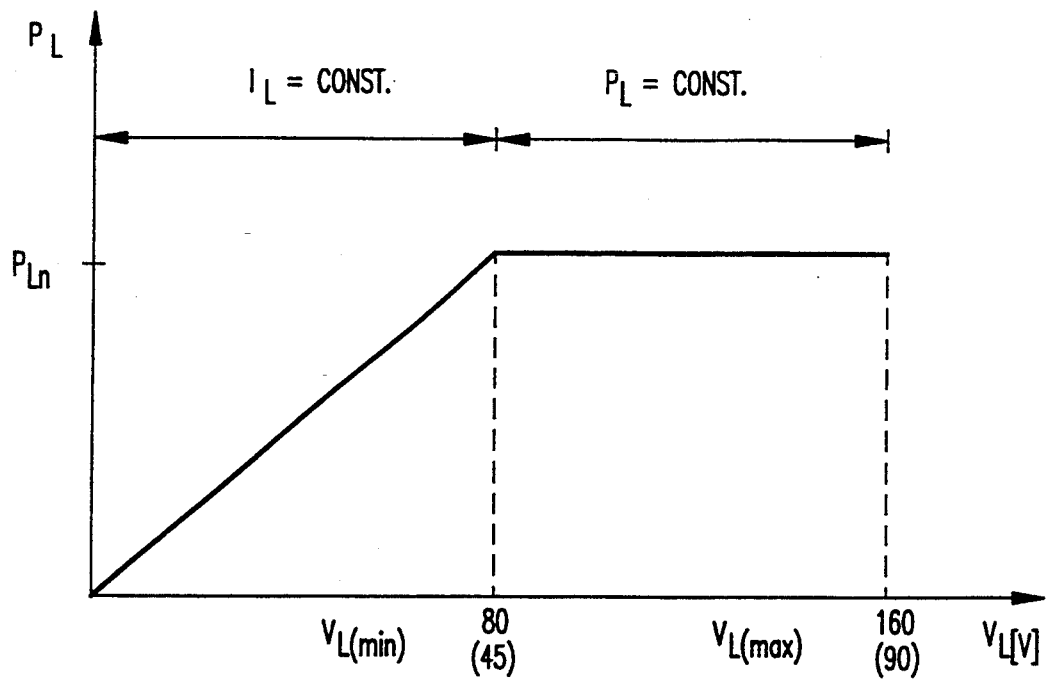
FIG. 3A illustrates the ballast curve as a diagram of lamp power versus lamp voltage realized by the preferred electronic ballast of the present invention.
Figure 3B:
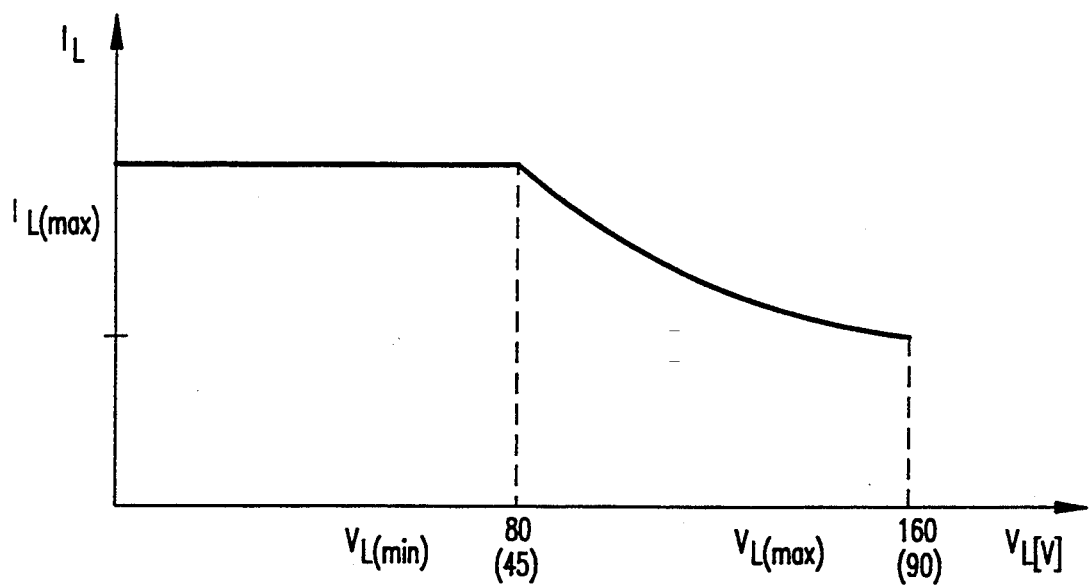
FIG. 3B shows the diagram of lamp current versus lamp voltage.

FIG. 3A illustrates the ballast curve as a diagram of the functional relationship between the lamp power ($P_L$) and the lamp voltage ($V_L$). Furthermore, FIG. 3B shows the diagram of lamp current ($I_L$) versus lamp voltage ($V_L$). Three different ranges can be distinguished, depending on the lamp voltage as it is shown in FIG. 3A and 3B, namely;

- a constant lamp current range in the warming up period ($0 \leq V_L \leq V_{L(min)}$);
- a constant lamp power range is a certain range of lamp voltage ($V_{L(min)} \leq V_L \leq V_{L(max)}$); and
- a forbidden range ($V_L > V_{L(max)}$), if the lamp voltage reaches $V_{L(max)}$ the ballast will automatically switch off.

Two different nominal lamp power levels can be selected by the preferred ballast, for instance 200 W or 250 W. Furthermore, the lamp power can be continuously changed providing dimming capability which can be significant from an energy saving viewpoint.

The six basic units of the present invention will now be explained.

Figure 4:
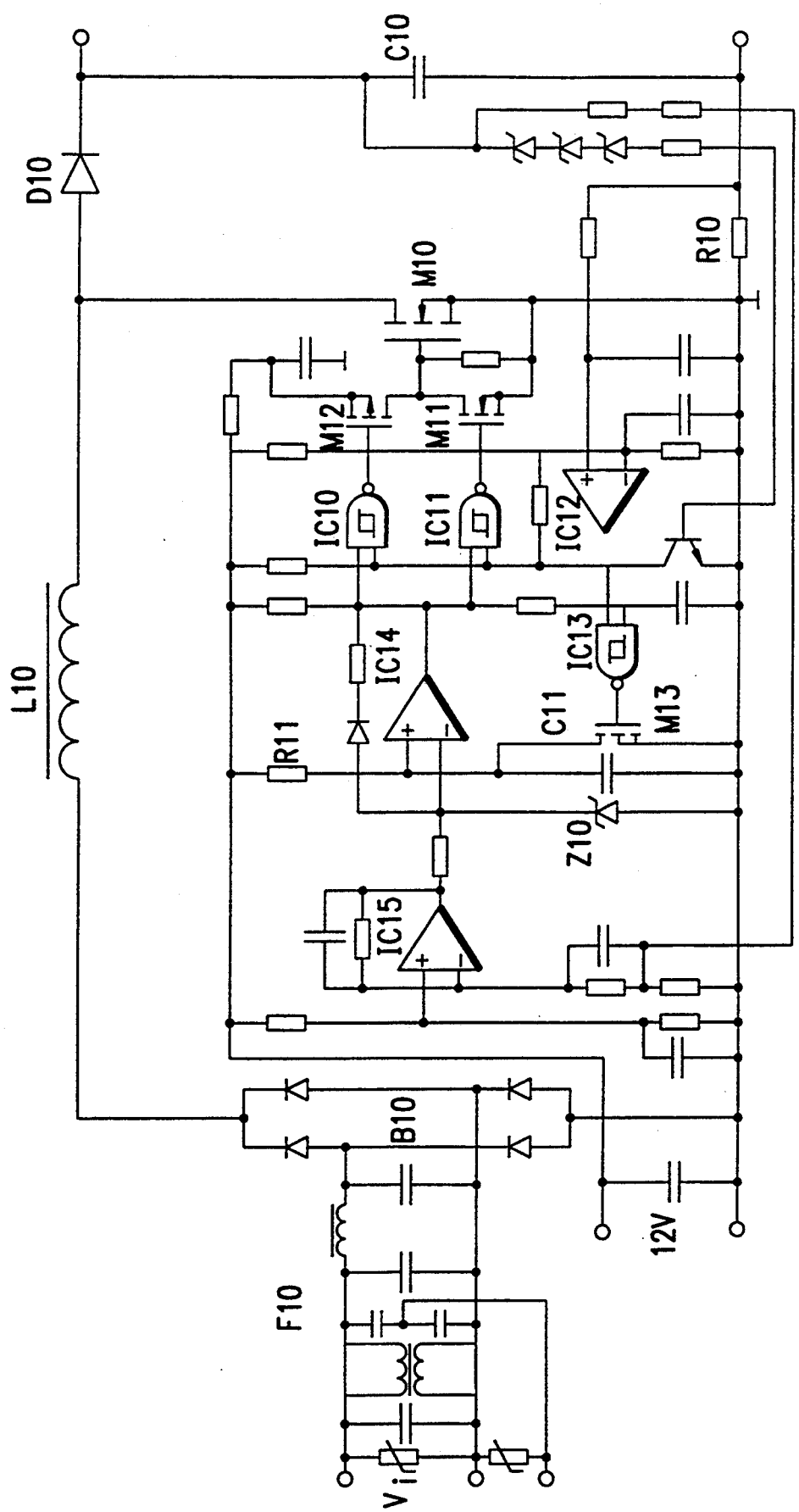
FIG. 4 shows the circuit diagram of a high power factor preregulator designated as UNIT-1 in FIG. 1.

UNIT-1 includes an input filter F10 and is shown in FIG. 4. The circuit is based on a standard boost converter configuration including a bridge rectifier B10, an inductor L10, a power MOSFET M10, a fast rectifier D10 and an output capacitor C10. Controlled on-time and zero current switching on techniques are applied. Therefore, the peak and average inductor current is sinusoidal as is the input voltage. The MOSFET driver designated as MD-1 in FIG. 1 is implemented by MOSFETs M11 and M12, the inputs of which are connected to the outputs of dual input NAND Schmitt-triggers IC10 and IC11, respectively.

The control unit designated as CU-1 in FIG. 1 includes:

- an error amplifier IC15;
- a saw-tooth generator implemented by a resistor R11, a capacitor C11, a MOSFET M13 and a NAND Schmitt-trigger IC13;
- a pulse width modulated (PWM) comparator IC14; and
- a zero current sensing comparator IC12 connected to a shunt resistor R10.

An essential difference between the preferred high power factor preregulator of the present invention and standard regulators, is the position of the shunt resistor R10. In this case, the voltage drop (which is proportional to the inductor current) on R10 is positive when compared to the zero level of the control unit providing sensitivity and less loss. This maximal on-time and the maximal inductor current is limited by Zener diode Z10. This solution is effective if the main switch M10 is switched on at zero inductor current level as in the preferred embodiment. A further difference between the preferred high power factor preregulator and standard regulators, is the utilization in the present invention, of a relatively small value film capacitor C10 instead of employing a large value electrolytic capacitor as the output capacitor. In the case, the fluctuation (120 Hz) of the output voltage $V_1$ is large as can be seen in FIG. 2B.

Figure 5A:
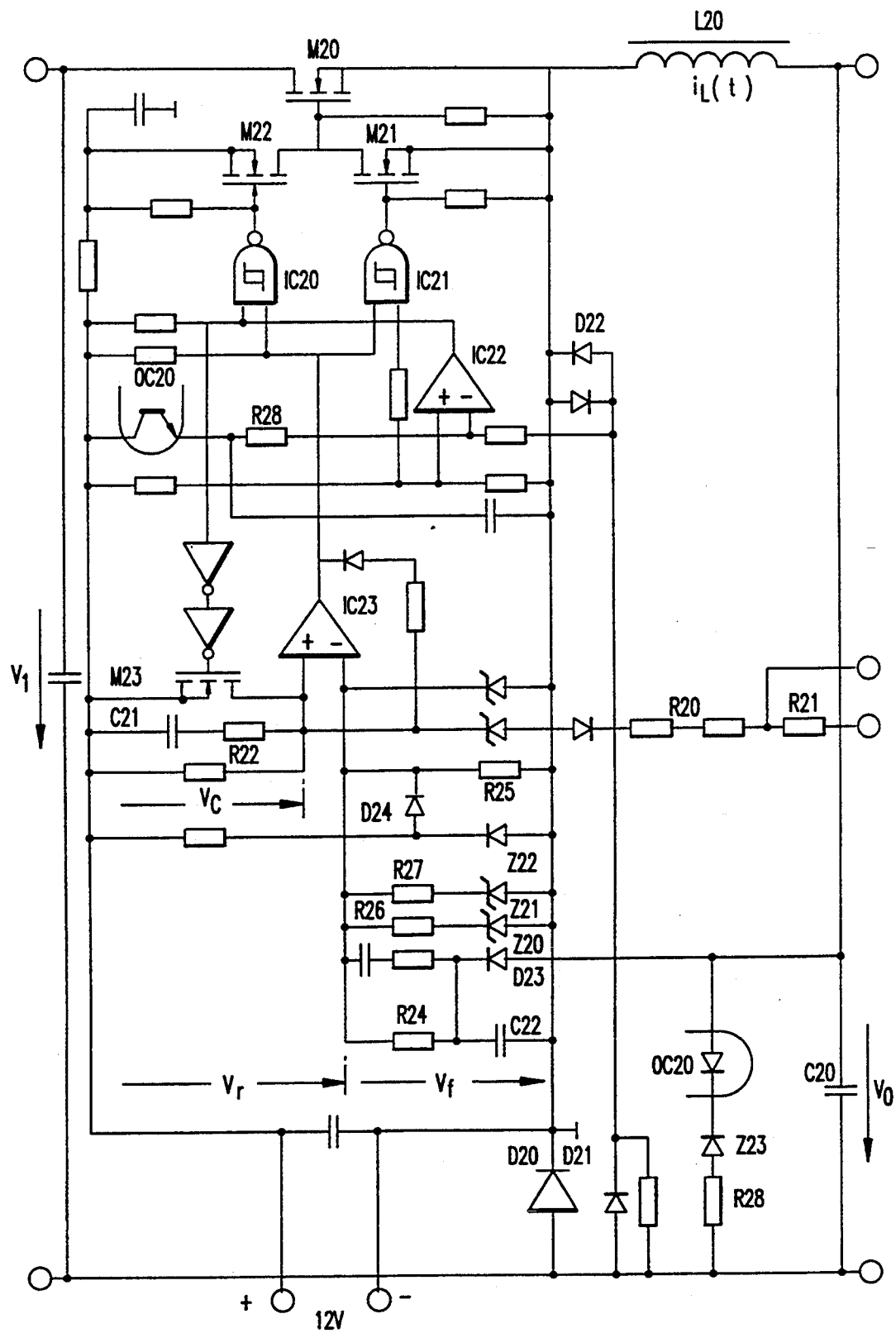
FIG. 5A shows the circuit diagram of a power control converter designated as UNIT-2 in FIG. 1.
Figure 5B:
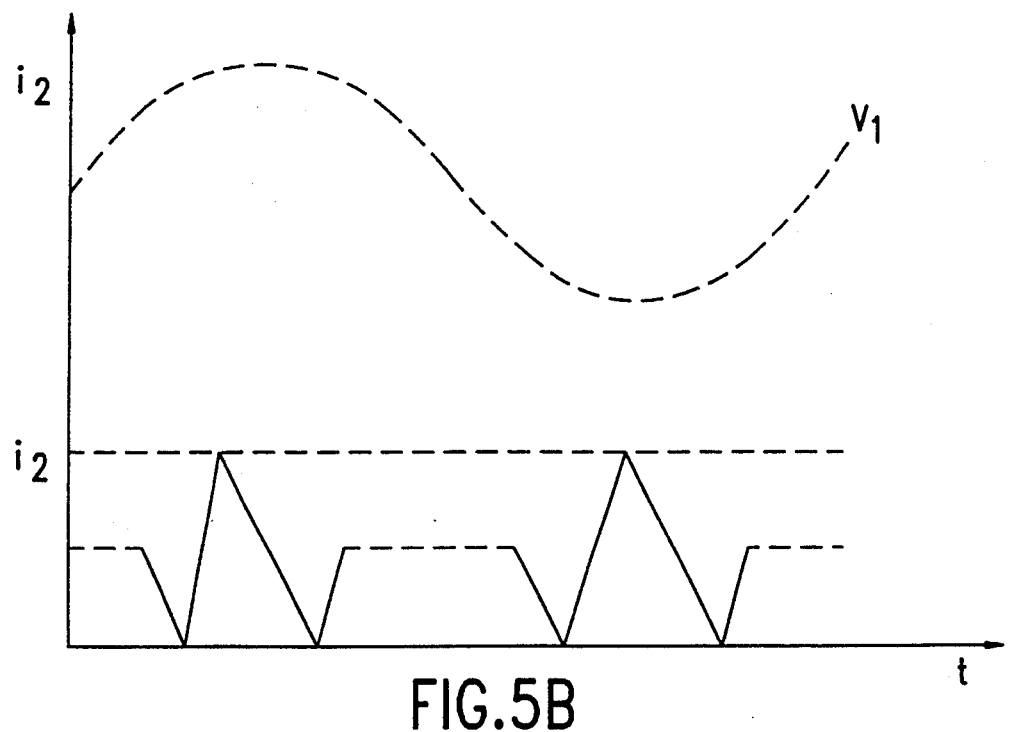
FIG. 5B illustrates a diagram of the inductor current with respect to UNIT-2.

UNIT-2, which is connected to the output capacitor C10 of UNIT-1 is shown in FIG. 5A. The power unit designated as PU-2 in FIG. 1 is based upon a standard buck converter configuration including a power MOSFET M20, a fast rectifier D20, an inductor L20 and an output (film) capacitor C20. The MOSFET driver designated as MD-2 in FIG. 1 is implemented by MOSFETs M21 and M22 controlled by dual input NAND Schmitt-triggers IC20 and IC21. The control unit designated as CU-2 in FIG. 1 is much different from the standard control methods. This control circuit will be described as follows:

a) Floating control: The control unit is connected directly to the MOSFET-driver MD-2 (M21 and M22) and therefore to the main switch M20.

b) Zero current sensing employing rectifiers: A fast rectifier D21 connected in series with a Schottky-rectifier D22 are connected in parallel to the main rectifier D20. If the main switch M20 is OFF, the main rectifier D20 is ON and an approximately 200 mV voltage drop occurs across the Schottky-rectifier D22. This voltage controls a voltage comparator IC22 connected to the first inputs of NAND Schmitt-triggers IC20 and IC21, which forces M20 OFF, implementing the only possibility of switching on M20 at zero inductor current. FIG. 5B illustrates the diagram of inductor current $i_L(t)$.

c) Control of inductor current: Assuming the ON-state of M20 and a discharged initial condition for capacitor C21, its voltage $V_c(t)$ can be calculated as follows:

$$V_c(t) = \frac{V_i - V_o}{RC} t$$

where t is the time with respect to an ON time interval, R=R20+R21 (the effect of R22 and R23 are neglected), C=C21 and $V_i$ and $V_o$ are the input and output voltages. Since the inductor current $i_L(t)$ is also proportional to $V_i - V_o$ we obtain:

$$i_L(t) = \frac{RC}{L} V_c(t)$$

where L is the inductance of inductor L20. Using a voltage comparator IC23 connected to the second inputs of dual input NAND Schmitt-triggers IC20 and IC21, the peak inductor current can be derived as follows:

$$I_p = \frac{RC}{L} V_r \tag{1}$$

where $I_p$ is the peak inductor current and $V_r = 12 - V_f$ is a given reference voltage as it is shown in FIG. 5A. Therefore the peak inductor current as well as the average inductor current $I_a = I_p/2$ can be directly controlled by a reference voltage $V_r$. To achieve the discharging of the capacitor C21, a low power P channel MOSFET M23 is connected to the output of the voltage comparator IC22, with capacitor C21 connected in parallel with the source and drain of this MOSFET.

d) Control of output power: Assuming that the reference voltage is proportional to the inverse value of output voltage $V_o$:

$$V_r = 12 - V_f = \frac{\alpha}{V_o}, \quad V_{o(min)} \leq V_o \leq V_{o(max)} \tag{2}$$

and substituting (2) into (1) we obtain:

$$P_A = \frac{I_p V_o}{2} = \frac{RC\alpha}{2L}$$

where $P_A$ is the average output power.

Figure 5C:
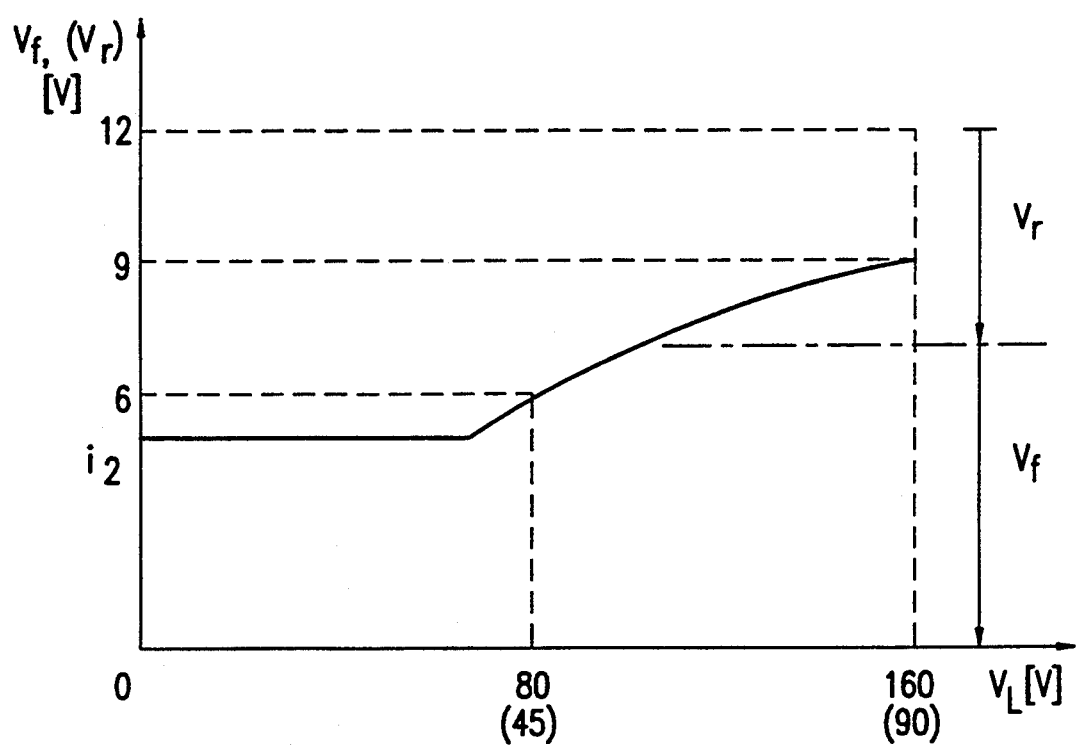
FIG. 5C illustrates a diagram of the functional relationship between output and control voltages.

Therefore, the control of a fixed output power is solved in a certain range of output voltage, assuming an electronic realization of equation (2) which will now be described.

e) Electronic realization of the functional relationship $V_r = \alpha/V_o$: The output voltage $V_o$ is boosted to the floating control level by employing a rectifier D23 and a smoothing capacitor C22. This is essentially the flyback method especially for a buck converter configuration without applying a secondary winding on inductor L20. Applying voltage divider resistors R24 and R25 and Zener diodes Z20 and Z21 connected in series with resistors R26 and R27 respectively, a sufficient ($\pm 1\%$) approximation of function $V_r = \alpha/V_o$ (in a certain range of output voltage) can be achieved, as it is illustrated in FIG. 5C. If $V_o < V_{o(min)}$, $V_r$ and therefore $I_p$ ($I_a$) is limited to an appropriate value by a Zener diode Z22 as it is also shown in FIG. 5A.

To achieve discharging capacitor C21, a low power P channel MOSFET M23 is connected to the output of the voltage comparator IC22, with capacitor C21 connected in parallel with the source and drain of this MOSFET.

For HPS lamps assuming 100 V nominal lamp voltage, $V_{o(min)} \approx 80$ V, $V_{o(max)} \approx 160$ V and $I_{L(max)} \approx 3$ amperes. The output voltage can be limited by applying a Zener diode Z23 ($V_z = 160$ V) connected in series with a current limiting resistor R28 and an optocoupler OC20 (connected also to IC22) providing OFF-state for the main switch M20. The output power can be changed by changing the value of resistor R21. For instance if R=R20=R21, the output power can be 250 W and if R=R20 (R21=0), the output power is 200 W. Furthermore, a continuous dimming of the output power (lamp power) can be achieved by a continuous decrease of the value of resistor R21, which can be advantageous from an energy saving consideration.

Figure 6A:
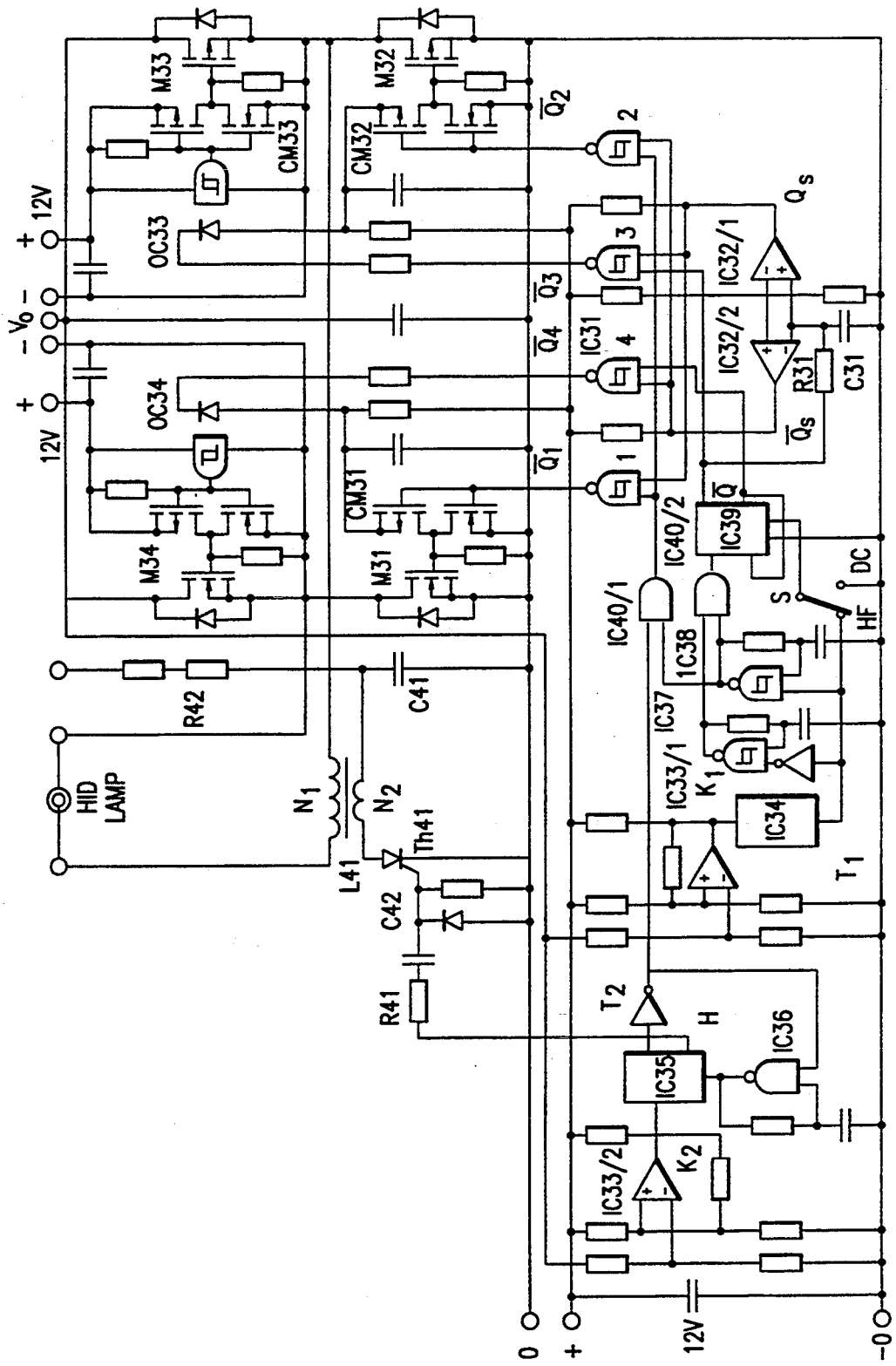
FIG. 6A shows the circuit diagram of a controlled fullbridge inverter and ignitor circuit designated as UNIT-3 and UNIT-4 in FIG. 1.
Figure 6B:
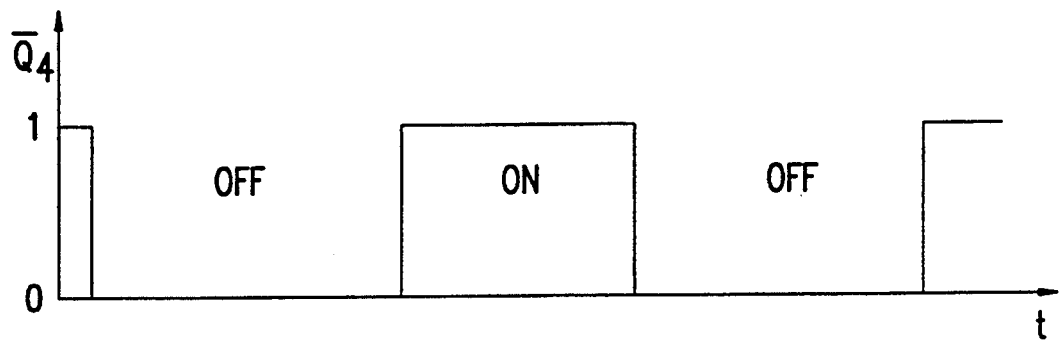
FIG. 6B illustrates the four output control signals of a logic drive unit designated as LD-3 in FIG. 1.
Figure 6B:
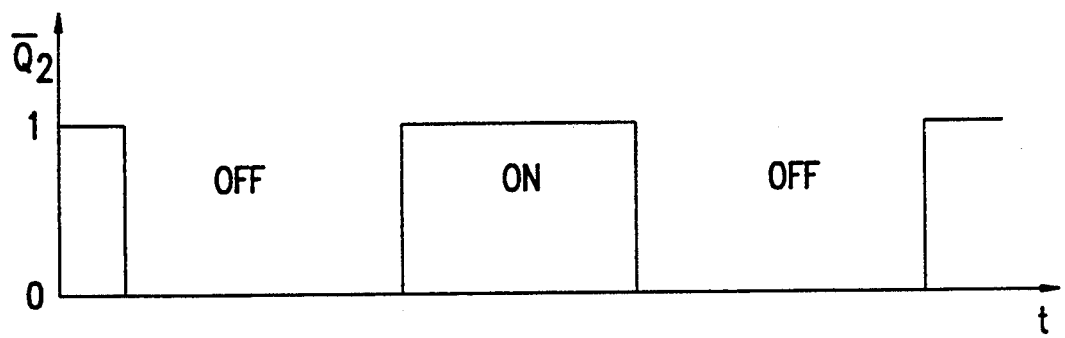
Figure 6B:
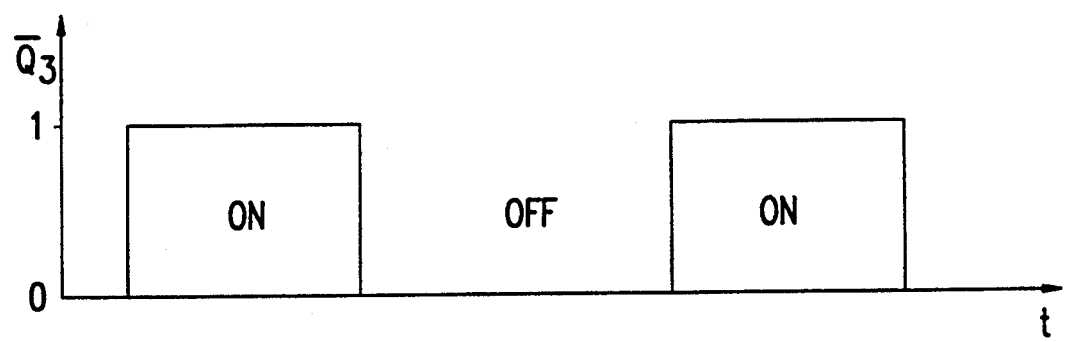
Figure 6B:
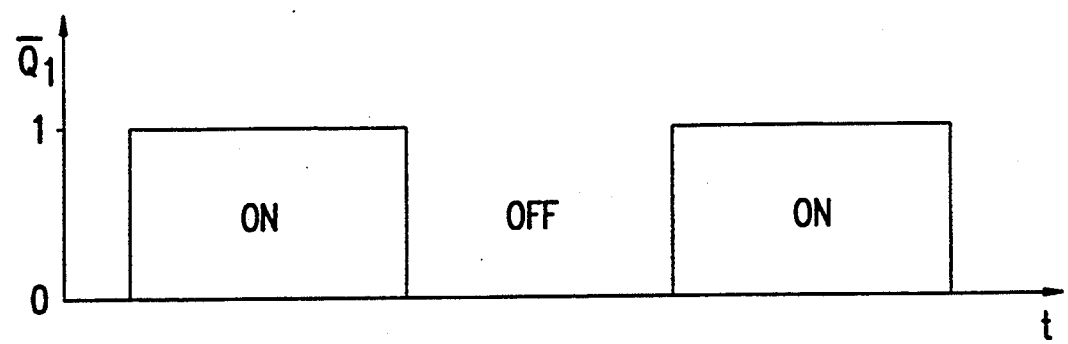

UNIT-3, which is connected to the output capacitor of UNIT-2 is shown in FIG. 6A. The power unit designated as PU-3 in FIG. 1 is based on a full-bridge configuration including MOSFETs M31, M32, M33 and M34. The MOSFET drivers designated as MD-3 in FIG. 1 are implemented by four complementary MOSFETs CM31, CM32, CM33 and CM34. Furthermore, complementary MOSFETs CM33 and CM34 are driven by optoisolators OC33 and OC34, respectively, providing isolation from the control level. The logic driver designated as LD-3 in FIG. 1 provides four logic signals $\overline{Q}_1$, $\overline{Q}_2$, $\overline{Q}_3$ and $\overline{Q}_4$ controlling the MOSFET driver MD-3. The logic driver signal waveforms for $\overline{Q}_1$, $\overline{Q}_2$, $\overline{Q}_3$ and $\overline{Q}_4$ are shown in FIG. 6B. The logic driver signals contain appropriate deadtimes avoiding cross conductions of the main switches. The symmetrical input logic signal Q is shifted with $\Delta t \approx 5$ μs by a dual comparator IC32/2 and IC32/1, and an RC circuit (R31, C31) resulting in signals $Q_s$ and $\overline{Q}_s$. The non-inverting input of IC32/1 and the inverting input of IC32/2 are connected to the common point of the RC circuit containing R31 and C31. The inverting input of IC32/1 and the non-inverting input of IC32/2 are connected to the common point of a voltage divider pair including resistors R32 and R33. Using dual input NAND gates IC31/1, IC31/2, IC31/3 and IC31/4, the four logic driver signals can be derived from the upper MOSFET driver as:

$$\overline{Q_3} = Q\overline{Q}_s, \quad \overline{Q_4} = Q Q_s$$

and for the lower MOSFET drivers as:

$$Q_1 = Q_s X, \quad \overline{Q_2} = \overline{Q_s X}$$

where X is an inhibition signal (if X=0, the lower MOSFETs M31 and M32 are switched off).

The logic control unit designated as CU-3 in FIG. 1 implements a time programmed starting and restarting process including the control of ignitor unit (UNIT-4), a low frequency symmetrical logic signal (Q) to control the logic driver in the normal operating (X=1), and an automatic switching off feature under no load or lamp failure conditions or in the case of an old lamp.

The control unit CU-3 including the following functional circuits:

a first voltage comparator (IC33/1) with a comparator level $V_1$, where $V_1$ is somewhat smaller than $V_{o(max)}$;

a second voltage comparator (IC33/2) with a comparator level $V_2$, where $V_2$ is somewhat smaller than $V_1$;

a first timer (IC34) having a timing period of $t_1 \approx 10s$;

a second timer including a digital counter IC35 and a digital oscillator IC36 having a timing period of $t_2 \approx 120s$;

a low frequency digital oscillator IC37 where the frequency $f_1 \approx 25$ Hz and the duty cycle is arbitrary;

a high frequency digital oscillator IC38 having a frequency $f_2 \approx 20$ kHz and the duty cycle being smaller than 0.5;

a T flip-flop implemented by a D flip-flop IC39 having a clock input and a SET input providing the symmetrical signal Q; and two AND gates IC40/1 and IC40/2, as well as two inverters whose functions are obvious from FIG. 6A.

Figure 6C:
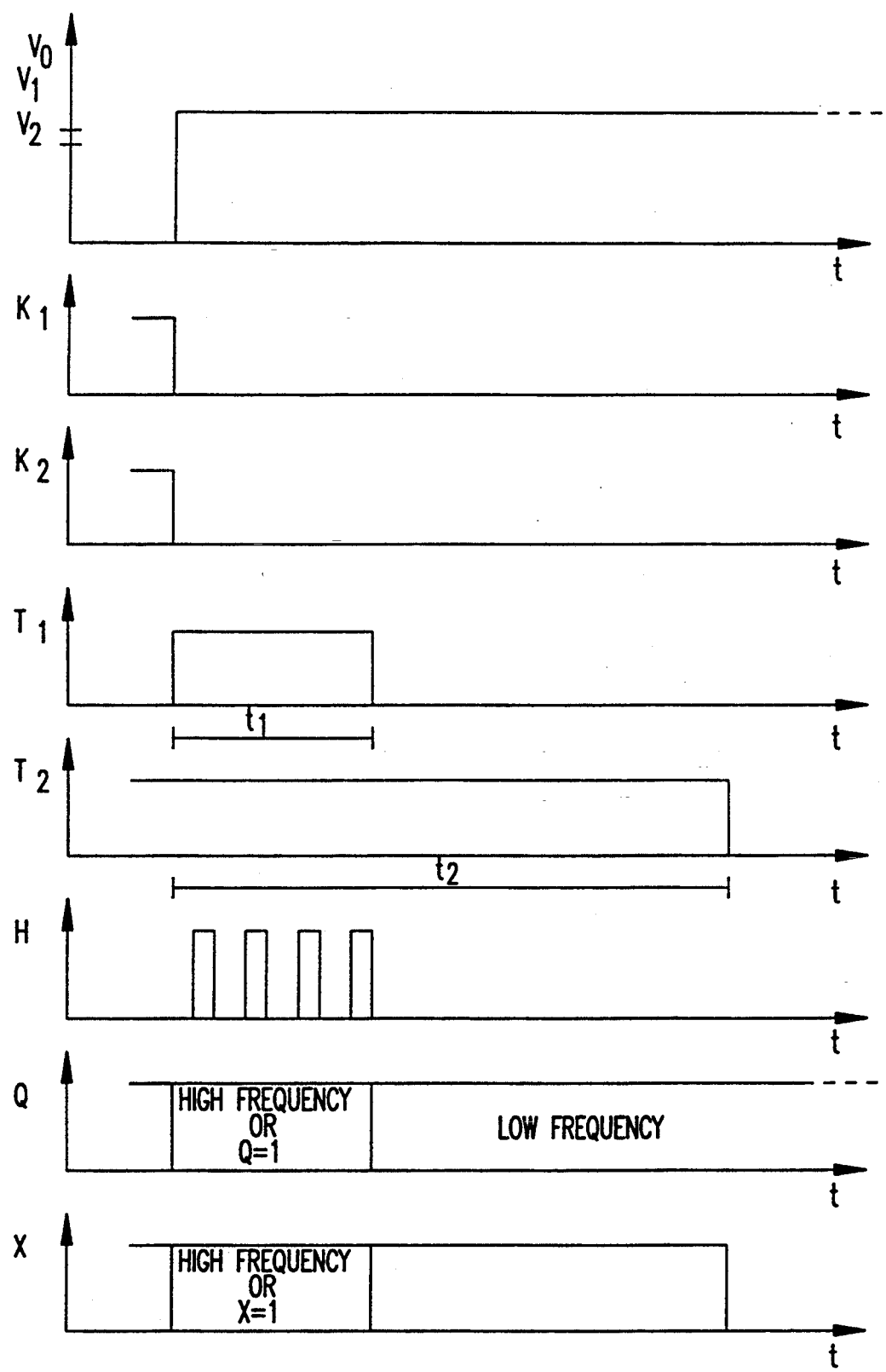
FIG. 6C illustrates a timing diagram with respect to UNIT-3 under no load condition.
Figure 6D:
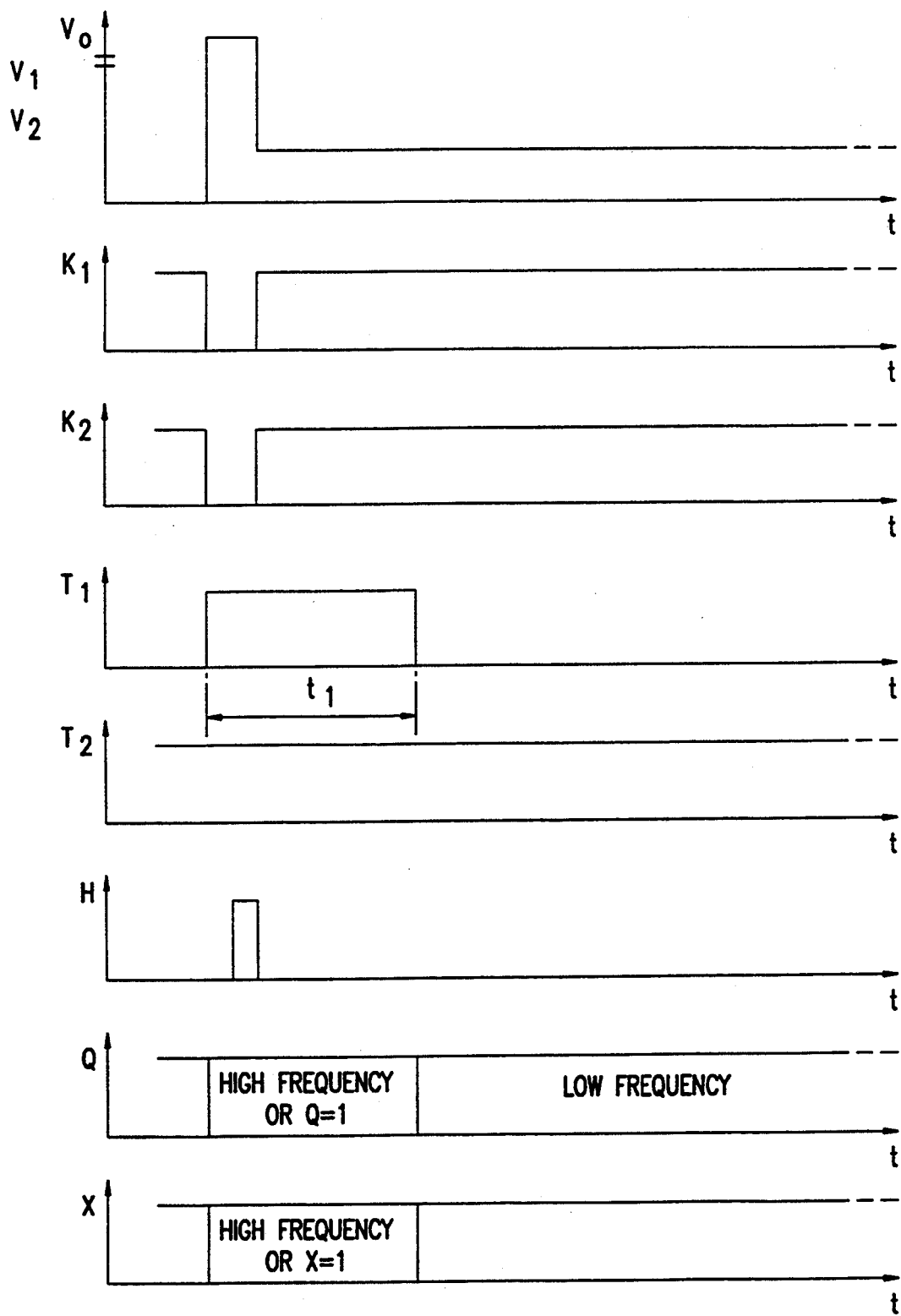
FIG. 6D illustrates a timing diagram with respect to UNIT-3 under loaded condition.

FIG. 6C shows the timing diagram under no load condition including the case of an unsuccessful ignition. FIG. 6D shows the timing diagram in the case of a successful ignition (normal operation). The ignited lamp operating quickly in a complicated plasma physical process (including the glow discharge) achieves the state of arc discharge, assuming that a sufficient high voltage and high current are provided. After achieving arc discharge, an important task of the circuit of the present invention is to stabilize the lamp in the arc discharge state. Since the discharge tube is cold, any slow zero current crossing can cause an extinction of arc discharge.

Therefore, there are two different short term starting methods for avoiding extinction as applying a high frequency current pulse operation, or a DC operation.

The time period of short term starting operation is implemented by the first timer ($t_1 \approx 10s$). After the short term starting period, the discharge becomes a normal low frequency ($\approx 50$ Hz) symmetrical square wave operation. The different starting operations can be selected by a switch S as it is shown in FIG. 6A, which switches between the high frequency (HF) or direct current (DC) mode. In the case of DC starting operation, the control circuit can be obviously simplified. For HPS lamps, the simpler DC starting method can be satisfactory. The square wave full-bridge PU-3 can be completed with one of the standard current limiting methods connected together with the control unit which is not shown in FIG. 6A.

UNIT-4, which is connected to the output of UNIT-3 is also shown in FIG. 6A. Additionally, resistor R42 is connected to the output capacitor C10 of the preregulator unit. UNIT-4 implements an ignitor for HID lamps providing high voltage ($\approx 3500$ V) ignition signals. The circuit is based on a pulse transformer configuration including a pulse transformer L41, a thyristor Th41, a capacitor C41 and an RC circuit (R41 and C42) connected to the gate of thyristor Th41. The capacitor C41 is charged by a resistor R42 connected to the output capacitor of UNIT-1. The capacitor C41 is discharged periodically by thyristor Th41 which is controlled by the digital counter of unit CU-3 with a repetition frequency of 2 Hz. The voltage of the fully charged capacitor C41 ($\approx 450$ V) is increased by a transformer including windings $N_1$, and $N_2$ where $N_1/N_2 = 8$. In normal operation the thyristor Th41 is switched off and the pulse transformer implemented by a gapped core inductor acting as a filter element. Furthermore, inductor L41 provides a continuous current flow through the lamp when the unit PU-3 changes the polarity of lamp voltage containing deadtimes.

Figure 7:
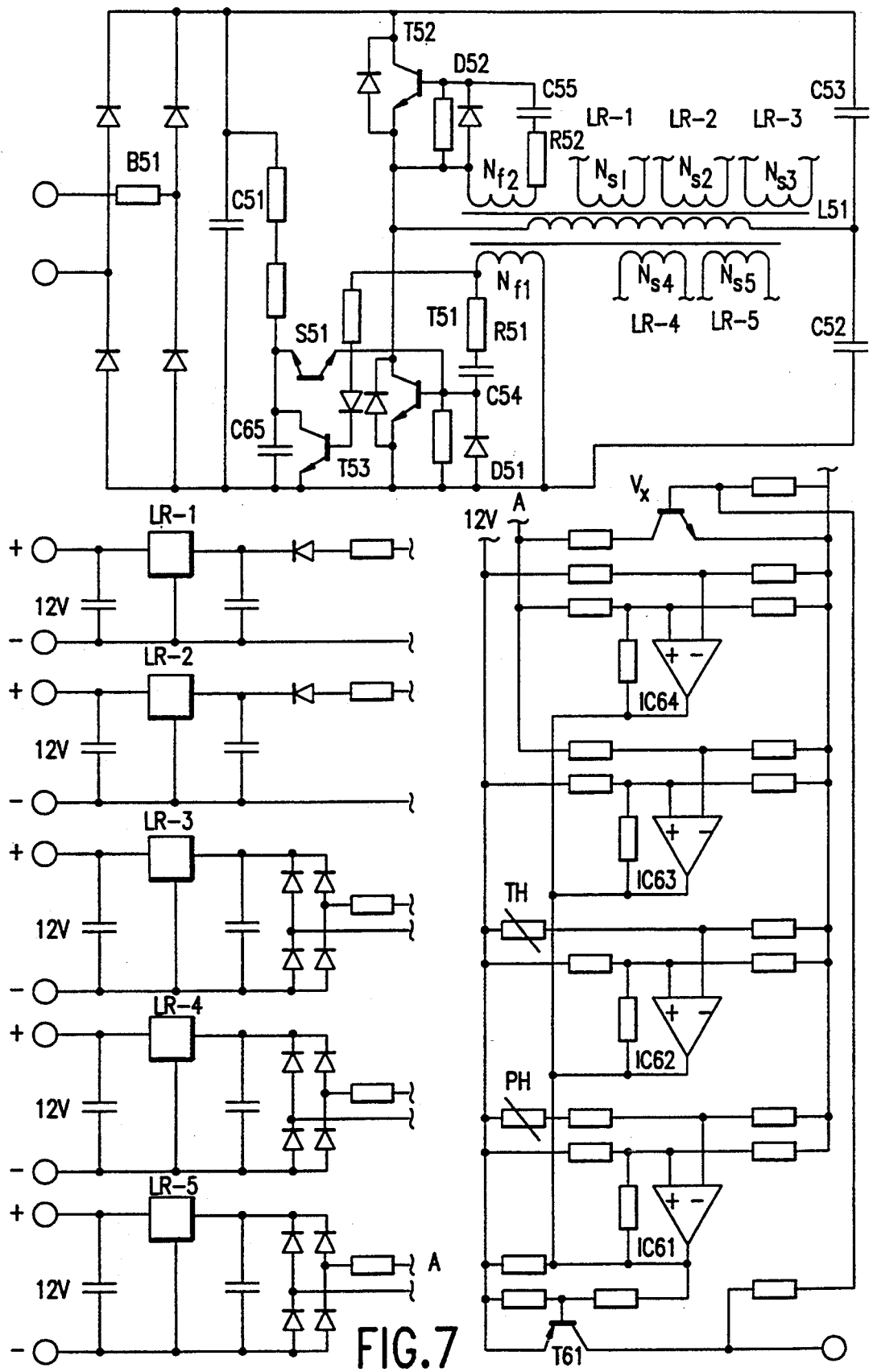
FIG. 7 shows the circuit diagram of a logic supply and a monitor unit designated as UNIT-5 and UNIT-6 in FIG. 1.

UNIT-5, which is connected to the sinusoidal AC power supply (more precisely to the common mode filter of UNIT-1) is shown in FIG. 7. UNIT-5, acting as a stabilized voltage source, includes a low power half-bridge square wave inverter designated as HB and five linear regulators designated as LR-1, LR-2, LR-3, LR-4 and LR-5. The low power self-oscillating half-bridge inverter (square wave oscillator) includes a rectifier bridge B51, an energy storage (film) capacitor C51, connected to the DC output of B51, two transistors T51 and T52 acting as controlled switches, two voltage divider capacitors C52 and C53 and a transformer L51 acting as a high frequency half-bridge square wave oscillator.

The transformer has a primary winding $N_p$, two feedback windings $N_{f1}$ and $N_{f2}$, and five secondary windings $N_{s1}$, $N_{s2}$, $N_{s3}$, $N_{s4}$ and $N_{s5}$ providing appropriate (non-stabilized) voltage sources for the five linear regulators. The feedback windings, connected in series with RC circuits (R51, C54 and R52, C55), are connected to the bases of transistors T51 and T52, providing decreasing base (diode) currents and therefore alternating switched ON or OFF states for the transistors. The self-oscillating feature is realized by the polarity change in the windings caused by the switched off magnetizing current of transformer L51. Furthermore, the circuit includes a self-switching off starter circuit implemented by a continuously charged capacitor C65, a DIAC S51 and a transistor T53 controlled by winding $N_{f1}$. The rectified output voltages are essentially DC voltages from a high frequency viewpoint. Therefore, only small value film capacitors can be used as smoothing elements. Stabilized output voltages (12 V) can be obtained by the use of any standard linear regulation methods.

UNIT-6 operates as a monitor unit including four Schmitt-triggers is also shown in FIG. 7. The Schmitt-triggers ST-1, ST-2, ST-3 and ST-4 (see FIG. 1) are implemented by four voltage comparators designated as IC61, IC62, IC63 and IC64. The first Schmitt-trigger (IC61) is controlled by a photoresistor (PH) implementing a light controlled switch. The second Schmitt-trigger (IC62) is controlled by a thermistor (TH) implementing a temperature controlled switch. The third and fourth Schmitt-trigger (IC63 and IC64) are controlled by a voltage $V_x$ which is proportional to the input voltage implementing a window comparator. Transistor T61 is controlled by the common outputs of comparators (AND connection) resulting the monitor unit. The output (M) of transistor T61 controls UNIT-1 and UNIT-2 implementing ON or OFF states for them as M=0 or M=1 ($\approx 12$ V).

Thus, while preferred embodiments of the present invention have been shown and described in detail, it is to be understood that such adaptations and modifications as occur to those skilled in the art may be employed without departing from the spirit and scope of the invention, as set forth in the claims.

What is claimed is:

1. A low frequency square wave electronic ballast for a gas discharge device comprising a high power factor preregulator connected to a power supply, wherein said high power factor preregulator is provided with a boost converter including an inductor, a first MOSFET having a source, a rectifier, and an output capacitor, as well as a control unit provided with a shunt resistor, wherein said shunt resistor is connected to said source of said first MOSFET and to said output capacitor, and said inductor and said rectifier are connected to said first MOSFET, and further including a complementary MOSFET pair connected to said first MOSFET and a driver MOSFET, first and second dual input NAND gates each having outputs connected to the gates of said complementary MOSFET pair implementing said driver MOSFET in which each of the MOSFETs of said the complementary MOSFET pair can be independently controlled.

2. A low frequency square wave electronic ballast for a gas discharge device in accordance with claim 1, wherein said control unit is connected to said first and second NAND gates, and further including a first and a second voltage comparator connected to the inputs of said dual input NAND gates, a sawtooth generator controlled by a third dual input NAND gate, wherein said first voltage comparator is connected to said shunt resistor implementing zero current sensing and further wherein the inverting input of said second voltage comparator is connected to said saw-tooth generator, the first input of said third NAND gate is connected to the delayed output of said second voltage comparator and the second input of said third dual input NAND gate is connected to the output of said first voltage comparator input, and further including an error amplifier, wherein the output of said error amplifier is connected to the non-inverting input of said second voltage comparator, implementing controlled ON-time technique in which the average current of said inductor is sinusoidal.

3. A low frequency square wave electronic ballast for a gas discharge device in accordance with claim 1, comprising a power controlled DC current source connected to said high power preregulator, wherein said power controlled DC current source is provided with a buck converter including a first MOSFET, an inductor, a first rectifier connected between said first MOSFET and said inductor, an output capacitor connected across said first rectifier, a complementary MOSFET pair connected to said first MOSFET, first and second dual input NAND gates connected to said complementary MOSFET pair and a control circuit connected directly to said first and said second dual input NAND gates implementing floating control, and further wherein said control circuit includes a zero inductor current sensing unit connected to the first inputs of said first and second dual input NAND gates, an inductor current control unit connected to the second inputs of said first and second dual input NAND gates and an output voltage inversion unit connected to said inductor current control unit providing a power controlled DC current source.

4. A low frequency square wave electronic ballast for a gas discharge device in accordance with claim 3, wherein said zero inductor current sensing unit includes a first voltage comparator, a second rectifier and a Schottky rectifier, wherein the cathode of said Schottky rectifier is connected to the cathode of said first rectifier, the anode of said second rectifier is connected to the anode of said first rectifier and the anode of said Schottky rectifier is connected to the cathode of said second rectifier, and further wherein the common point of said Schottky and said second rectifiers is connected to said first voltage comparator implementing the sensing of the zero level of inductor current in the OFF state of said first MOSFET.

5. A low frequency square wave electronic ballast for a gas discharge device in accordance with claim 3, wherein said inductor current control unit includes a second voltage comparator, a second MOSFET having a source and drain, said second MOSFET connected to the output of said first voltage comparator, a first capacitor connected in parallel with the source and drain of said second MOSFET, a third rectifier connected to said first capacitor and a first resistor connected in series with said third rectifier, and further wherein the common point of said third rectifier and said first capacitor is connected to the non-inverting input of said second voltage comparator, said first rectifier being connected to the positive terminal of said output capacitor and the source of said second MOSFET being connected to the positive logic supply of said control circuit, providing an analog modelling of the inductor current in the ON-state of said first MOSFET.

6. A low frequency square wave electronic ballast for a gas discharge device in accordance with claim 3, wherein said output voltage inversion unit includes a second capacitor, a fourth rectifier, a voltage divider resistor pair connected to said second capacitor, a first and a second Zener diode connected in series with a second and a third resistor, respectively, wherein the cathode of said fourth rectifier is connected to the positive terminal of said output capacitor, the anode of said fourth rectifier is connected to the first terminal of said second capacitor, the second terminal of said second capacitor and said second and third resistors are connected to the zero level of said control circuit and said first and said second Zener diodes are connected to the common point of said voltage divider resistor pair, and further wherein the common point of said voltage divider resistor pair is connected to the inverting input of said second voltage comparator, implementing constant output power in the range of a non-zero minimum and a maximum output voltage and further including a third Zener diode connected in series with a third resistor which are connected to the logic supply of said control circuit, and a fifth rectifier connected to the common point of said third Zener diode and said third resistor wherein the cathode of said fifth rectifier is connected to the inverting input of said second voltage comparator implementing a constant output current in the range of the zero and a non-zero minimum output voltage.

7. A low frequency square wave electronic ballast for a gas discharge device in accordance with claim 3, comprising a low frequency square wave DC-to-AC inverter connected to said power controlled DC current source wherein said low frequency square wave DC-to-AC inverter includes first, second, third and fourth MOSFETs, first, second, third and fourth complementary MOSFET pairs, first and second logic optoisolators, a logic signal driver unit and a frequency control unit, wherein said first and said second complementary MOSFET pairs are connected to said first and said second MOSFETs, said third and said fourth complementary MOSFET pairs are connected to said third and said fourth MOSFETs, said first and said second logic optoisolators are connected to said third and said fourth complementary MOSFET pairs, said first and said second complementary MOSFET pairs and said first and said second logic optoisolators are connected to said logic signal driver unit and said logic signal driver unit is connected to said frequency control unit, implementing a time programmed frequency control including DC operations of said low frequency square wave DC-to-AC inverter.

8. A low frequency square wave electronic ballast for a gas discharge device in accordance with claim 7, wherein said logic signal driver unit includes first, second, third and fourth dual input NAND gates, first and second voltage comparators, an RC circuit, a voltage divider resistor pair connected to the logic supply of said logic signal driver unit, a logic control input and an inhibition input, wherein said RC circuit is connected to said logic control input and the zero voltage level of said logic driver, the non-inverting input of said first voltage comparator and the inverting input of said second voltage comparators are connected to the common point of said RC circuit, the inverting input of said first voltage comparator and the non-inverting input of said second voltage comparator are connected to the common point of said voltage divider resistor pair, the output of said first voltage comparator is connected to the first inputs of said first and said third dual input NAND gates, the output of said second voltage comparator is connected to the first inputs of said second and fourth dual input NAND gates, the second input of said third dual input NAND gate is connected to said logic control input, the second input of said fourth dual input NAND gate is connected to the inverter logic control signal and the second inputs of said first and said second dual input NAND gates are connected to said inhibiting input and further wherein the outputs of said first, second, third and fourth dual input NAND gates are connected to said first complementary MOSFET pair, said second complementary MOSFET pair, said first logic optoisolator and said second logic optoisolator, implementing an alternating switching or DC operation, or an inhibition of said square wave inverter including deadtime control avoiding cross conductions of said first, second, third and fourth MOSFETs.

9. A low frequency square wave electronic ballast for a gas discharge device in accordance with claim 7, wherein said frequency control unit includes a third and a fourth voltage comparator, a digital timer having a first and a second output, an analog timer, a low frequency digital oscillator and a D flip-flop wherein said third and said fourth voltage comparators are controlled by the input voltage of said square wave inverter, said digital timer is controlled by said third voltage comparator, said analog timer is controlled by said fourth voltage comparator, the output of said low frequency digital oscillator is connected to the clock input of said D flip-flop, the output of said analog timer is connected to the SET input of said D flip-flop and the output of said D flip-flop is connected to the logic control input of said logic driver providing a short term time programmed DC operation and the transition to normal low frequency operation of said square wave inverter under loaded condition, and further wherein the first output of said digital timer is connected to the inhibition input of said logic driver implementing a long term time programmed inhibiting of said square wave inverter under low load condition.

10. A low frequency square wave electronic ballast for a gas discharge device in accordance with claim 3, wherein said frequency control unit further includes a high frequency digital oscillator controlled by said analog timer and first and second AND gates, wherein the output of said high frequency digital oscillator and the first output of said digital timer is connected to said first AND gate, the output of which is connected to said logical signal unit and the output of said low frequency digital oscillator, and the output of said high frequency digital oscillator is connected to said second AND gate, the output of which is connected to said D flip-flop providing a short term time programmed high frequency current pulse operation of said square wave inverter.

11. A low frequency square wave electronic ballast for a gas discharge device in accordance with claim 7, comprising an ignitor circuit connected to said high power factor preregulator and connected to said low frequency square wave DC-to-AC inverter, wherein said ignitor circuit includes a pulse transformer having first and second windings, a resistor connected to the output capacitor of said high power factor pre-regulator, a capacitor connected to said resistor, a thyristor and an RC circuit connected to the gate of said thyristor and second output of said digital timer, wherein said second winding of said pulse transformer is connected to said capacitor and said thyristor, and further wherein said first winding of said pulse transformer is connected in series with the output of said square wave inverter and said gas discharge device, providing periodical high voltage ignition pulses for said gas discharge device.

12. A low frequency square wave electronic ballast for a gas discharge device in accordance with claim 7 comprising a low power stabilized logic supply voltage source connected to said high power factor preregulator, also connected to said power controlled DC current source and to said low frequency square wave DC-to-AC inverter, wherein said low power stabilized logic supply voltage source includes a bridge rectifier connected to said power supply, a first capacitor connected to the DC output of said bridge rectifier, a high frequency half-bridge square wave oscillator connected to said first capacitor, and five linear regulators connected to said high frequency half-bridge square wave oscillator, and further wherein said high frequency half-bridge square wave oscillator includes first and second transistors, second and third capacitors operating as voltage divider capacitors, a transformer having a primary winding connected to the common points of said transistors and said voltage divider capacitors, first and second feedback windings and five secondary windings, said high frequency half-bridge square wave oscillator further including a first RC circuit connected to said first feedback winding and the base of said first transistor, a second RC circuit connected to said second feedback winding and the base of said second transistor, and a self-switching off starter connected to the base of said first transistor, providing five isolated nonstabilized high frequency square wave voltage sources providing five isolated and stabilized logic supply voltage sources.

13. A low frequency square wave electronic ballast for a gas discharge device in accordance with claim 12, comprising a monitor circuit connected to said low power stabilized logic supply voltage source, wherein said monitor circuit includes a first and a second voltage comparator controlled by the rectified voltage of said power supply implementing a window comparator for input voltage, a third voltage comparator, a photoresistor controlling said third voltage comparator, a fourth voltage comparator, a thermistor controlling said fourth voltage comparator, and further wherein said high power factor preregulator and said power controlled DC current source are controlled by the outputs of said voltage comparators providing a light controlled switch, an over temperature protection and a logic supply voltage protection.

* * * * *